(12) United States Patent
Heebner

(10) Patent No.: US 11,338,378 B2
(45) Date of Patent: May 24, 2022

(54) SAW CHAIN HOLDER

(71) Applicant: Mark Heebner, York Springs, PA (US)

(72) Inventor: Mark Heebner, York Springs, PA (US)

(73) Assignee: Mark Heebner, York Springs, PA (US)

( * ) Notice: Subject to any disclaimer, the term of this patent is extended or adjusted under 35 U.S.C. 154(b) by 98 days.

(21) Appl. No.: 17/003,866

(22) Filed: Aug. 26, 2020

(65) Prior Publication Data

US 2020/0391312 A1 Dec. 17, 2020

Related U.S. Application Data

(63) Continuation-in-part of application No. 16/193,674, filed on Nov. 16, 2018, now Pat. No. 10,799,969.

(51) Int. Cl.
*B23D 63/16* (2006.01)
*B23D 63/00* (2006.01)

(52) U.S. Cl.
CPC ......... *B23D 63/164* (2013.01); *B23D 63/003* (2013.01); *B23D 63/168* (2013.01)

(58) Field of Classification Search
CPC ..... B23D 63/162; B23D 63/16; B26D 63/164
See application file for complete search history.

(56) References Cited

U.S. PATENT DOCUMENTS

| | | |
|---|---|---|
| 2,415,137 A | 2/1947 | Johnson |
| 2,480,546 A * | 8/1949 | Bryson ................ B23D 63/162 |
| | | 76/47.1 |
| 2,627,191 A | 2/1953 | Parr |
| 2,677,289 A | 5/1954 | Fitch |
| 2,798,385 A | 7/1957 | Schwab, Jr. |
| 2,813,438 A | 11/1957 | Paradis et al. |
| 2,832,237 A | 4/1958 | Calver |
| 2,995,959 A | 8/1961 | Mills |
| 3,027,784 A | 4/1962 | Weatherly |
| 3,038,355 A | 6/1962 | Granberg |
| 3,349,645 A | 10/1967 | Silvey |

(Continued)

FOREIGN PATENT DOCUMENTS

| | | |
|---|---|---|
| CA | 730581 A | 3/1966 |
| JP | 55018381 A | 2/1980 |

OTHER PUBLICATIONS

PCT Notification, The International Preliminary Report on Patentability, dated May 18, 2021, 8 pages.

(Continued)

*Primary Examiner* — Jennifer S Matthews
(74) *Attorney, Agent, or Firm* — Barley Snyder

(57) ABSTRACT

A saw chain holder with a bar mounted sharpener for sharpening a chain includes a base plate and a cover plate removably attachable to the base plate. The base plate has a first base side surface, an opposite second base side surface, a groove extending into the first base side surface, and a base recess extending into the second base side surface. The cover plate has a first cover side surface and an opposite second cover side surface. The cover plate is movable into an assembled state in which the first cover side surface abuts the first base side surface, the chain is movable along the groove between the base plate and the cover plate, and the bar mounted sharpener is mounted in the base recess, bears against the second cover side surface, and is positioned over the groove.

20 Claims, 12 Drawing Sheets

(56) References Cited

U.S. PATENT DOCUMENTS

| | | | | |
|---|---|---|---|---|
| 3,744,349 | A * | 7/1973 | Juncker | B23D 63/162 76/80.5 |
| 3,941,363 | A | 3/1976 | Ogg | |
| 4,109,900 | A | 8/1978 | Vandecoevering | |
| 4,375,173 | A | 3/1983 | Lesmeister | |
| 4,404,871 | A * | 9/1983 | Fritz | B23D 63/162 33/202 |
| 4,416,169 | A * | 11/1983 | Silvey | B23D 63/16 76/33 |
| RE31,504 | E | 1/1984 | Aksamit | |
| 4,438,667 | A * | 3/1984 | Hannah | B23D 63/162 76/36 |
| 4,463,499 | A * | 8/1984 | Fritz | B23D 63/16 16/110.1 |
| 4,677,881 | A * | 7/1987 | Jorde | B23D 63/162 76/37 |
| 4,719,823 | A | 1/1988 | Pyle | |
| 5,033,333 | A * | 7/1991 | Shepherd | B23D 63/16 76/37 |
| 7,862,406 | B2 | 1/2011 | McIntyre | |
| 8,616,038 | B2 | 12/2013 | Breen et al. | |
| 2007/0119278 | A1 * | 5/2007 | Ranker | B23D 63/162 76/78.1 |
| 2007/0167121 | A1 | 7/2007 | Cendak | |

OTHER PUBLICATIONS

PCT Notification, The International Search Report and The Written Opinion of the International Searching Authority, dated Feb. 20, 2020, 15 pages.

* cited by examiner

US 11,338,378 B2

SAW CHAIN HOLDER

CROSS-REFERENCE TO RELATED APPLICATION

This application is a continuation-in-part of U.S. patent application Ser. No. 16/193,674, filed on Nov. 16, 2018.

FIELD OF THE INVENTION

The present invention relates to a saw chain holder and, more particularly, to a saw chain holder for sharpening a saw chain of a chainsaw.

BACKGROUND

A saw chain of a chainsaw is driven along a bar by a motor in the chainsaw to perform a cutting operation. After a number of uses, the saw chain can become dull. A dull saw chain is inefficient and imprecise in cutting, can damage other components of the chainsaw such as the motor, and can also pose a danger to the user of the chainsaw. A dull saw chain can either be replaced with a new saw chain or sharpened.

A bar mounted sharpener is capable of sharpening a dull saw chain. The bar mounted sharpener mounts to the bar of the chainsaw about the saw chain and is manually operable to individually sharpen the teeth of the saw chain. The bar mounted sharpener, however, is specifically adapted to mount on the bar of the chainsaw and cannot be used with a saw chain which has been removed from the bar. The sharpening process of the bar mounted sharpener therefore requires the saw chain being sharpened to remain mounted on the chainsaw and removes a chainsaw from operation during sharpening; the chainsaw cannot be used, for example, with a different, sharp saw chain while the dull saw chain is sharpened. The required bar mounting of the bar mounted sharpener limits flexibility in sharpening dull saw chains, requires a cumbersome sharpening arrangement by attaching to the chainsaw, and is inefficient by removing a chainsaw from operation during the sharpening.

SUMMARY

A saw chain holder with a bar mounted sharpener for sharpening a chain includes a base plate and a cover plate removably attachable to the base plate. The base plate has a first base side surface, an opposite second base side surface, a groove extending into the first base side surface, and a base recess extending into the second base side surface. The cover plate has a first cover side surface and an opposite second cover side surface. The cover plate is movable into an assembled state in which the first cover side surface abuts the first base side surface, the chain is movable along the groove between the base plate and the cover plate, and the bar mounted sharpener is mounted in the base recess, bears against the second cover side surface, and is positioned over the groove.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
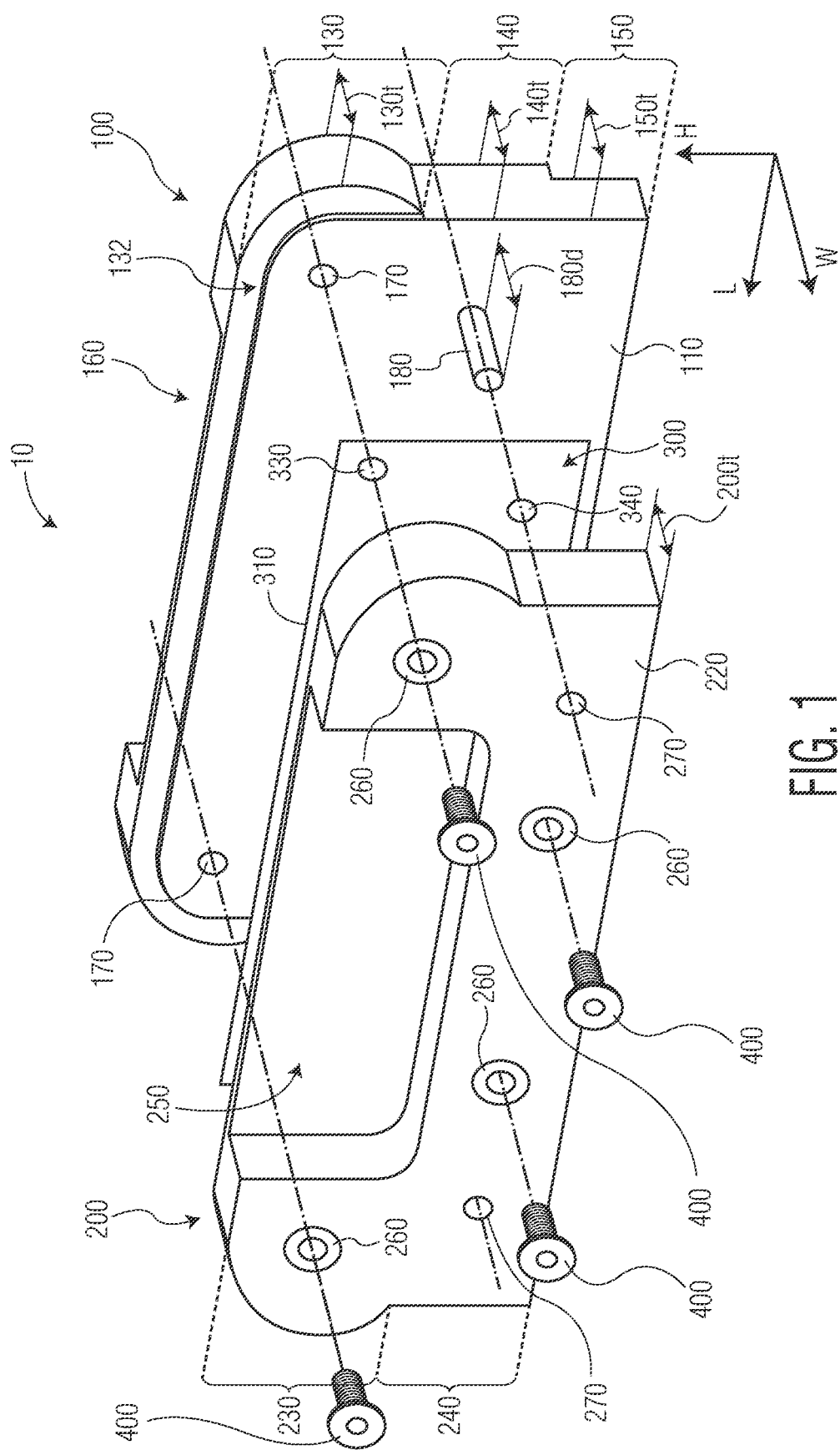
FIG. 1 is an exploded perspective view of a saw chain holder according to an embodiment.

Embodiments of the present invention will be described hereinafter in detail with reference to the attached drawings, wherein like reference numerals refer to like elements. The present invention may, however, be embodied in many different forms and should not be construed as being limited to the embodiments set forth herein; rather, these embodiments are provided so that the disclosure will be thorough and complete and will fully convey the concept of the invention to those skilled in the art.

A saw chain holder 10 according to an embodiment is shown in FIG. 1. The saw chain holder 10 comprises a base plate 100, a cover plate 200 removably attachable to the base plate 100, and a spacer 300 disposed between the base plate 100 and the cover plate 200. A plurality of fasteners 400 are adapted to removably secure the base plate 100 to the cover plate 200 with the spacer 300 disposed between the base plate 100 and the cover plate 200.

The base plate 100, as shown in the embodiment of FIGS. 1-4, is approximately rectangular with a first base side surface 110 and an opposite second base side surface 120. The first base side surface 110 and the second base side surface 120 are opposite one another in a width direction W shown in FIG. 1. The base plate 100 has a base chain section 130, a base body section 140, and a mounting section 150 extending along a height direction H perpendicular to the width direction W.

The base plate 100 is formed of a hard, durable material. In various embodiments, the base plate 100 may be formed of various alloys and grades of metals, such as aluminum or steel, or various types of plastic such as polyethylene. In the shown embodiment, the base plate 100 is integrally formed in a single piece. The base plate 100 may be machined from a billet into the shown configuration, cast in a mold and then machined into the shown configuration, or molded into the shown configuration. In other embodiments, the base plate 100 may be assembled from a plurality of components.

Figure 3:
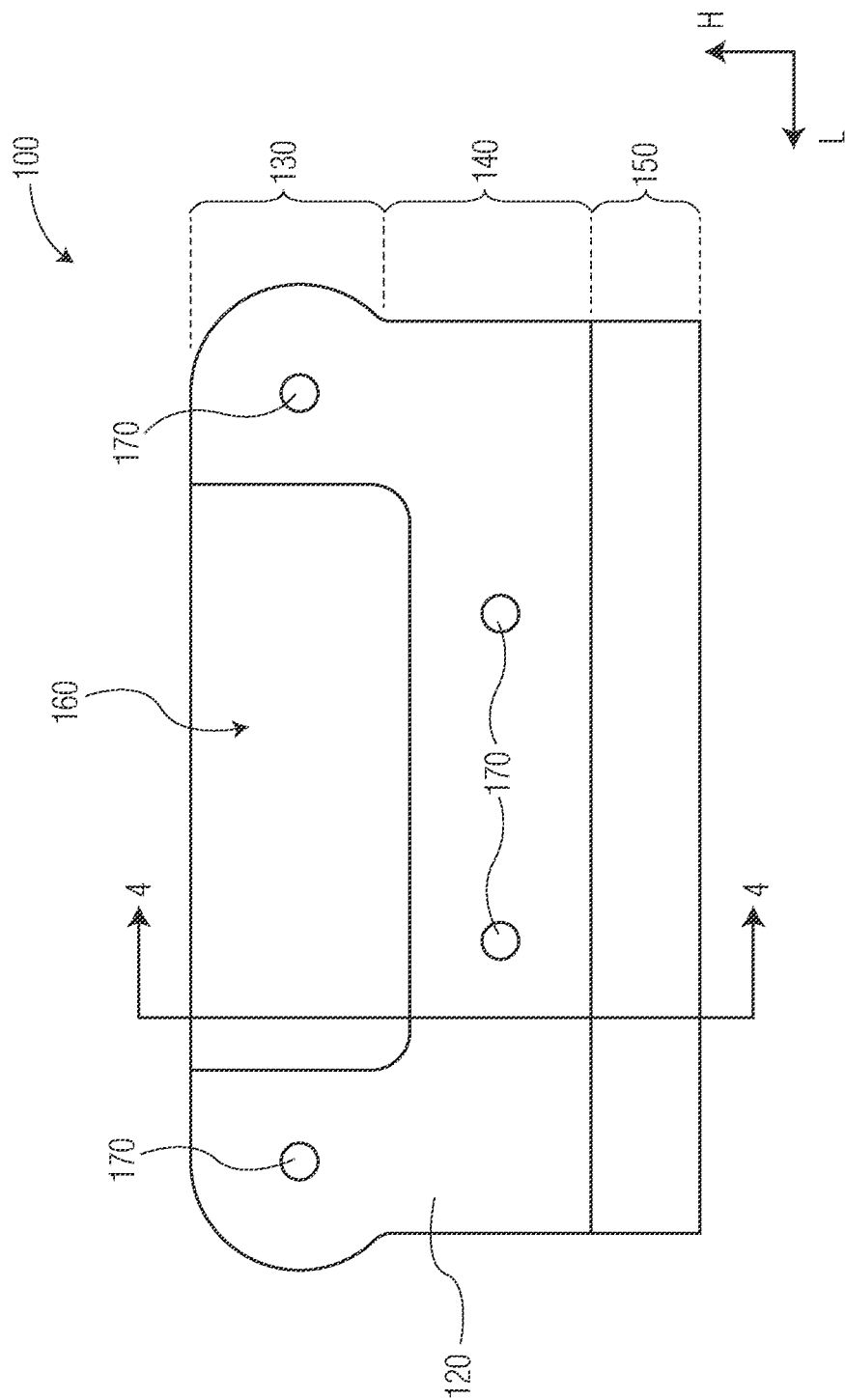
FIG. 3 is a side view of the base plate.
Figure 4:
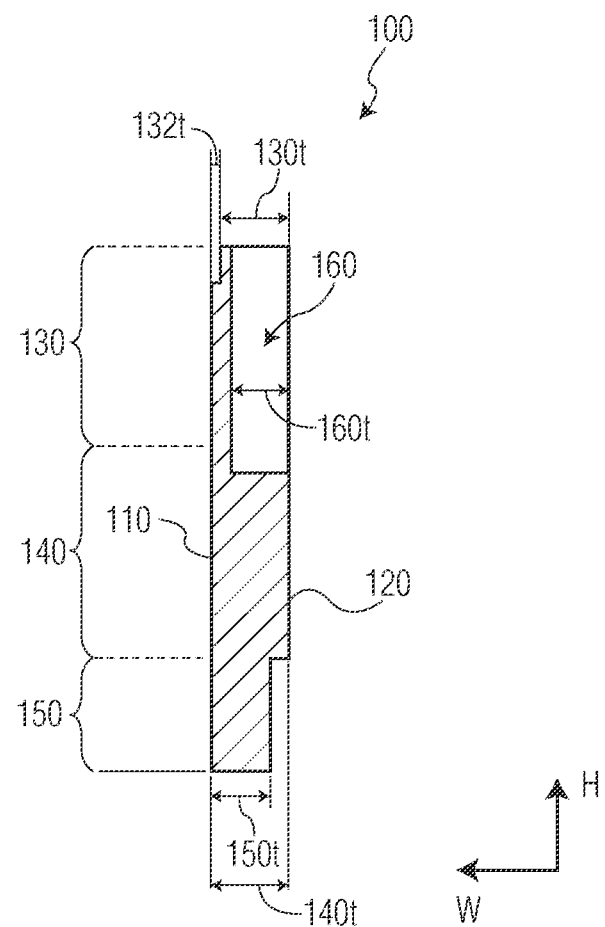
FIG. 4 is a sectional end view of the base plate, taken along the line 4-4 of FIG. 3.

The base chain section 130, shown in FIGS. 1, 3, and 4, protrudes from the base body section 140 in the height direction H and a longitudinal direction L. The longitudinal direction L is perpendicular to the height direction H and the width direction W. In the shown embodiment, the base chain section 130 has rounded end corners opposite one another along the longitudinal direction L. In other embodiments, the shape of the end corners of the base chain section 130 are not necessarily round, but could be a 90° corner, a corner with multiple straight facets, or any other shape of corner that allows a chain to pass thereover.

Figure 2:
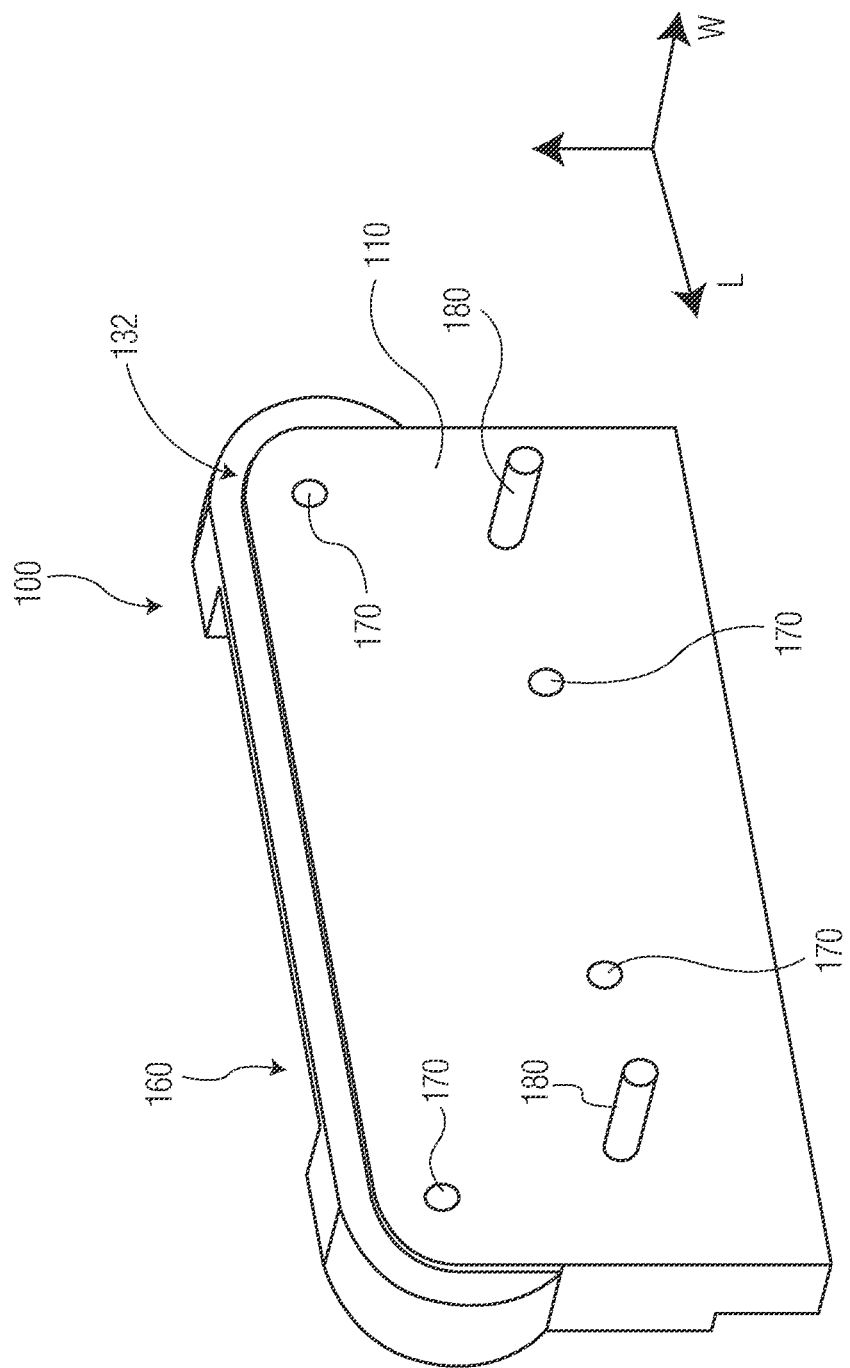
FIG. 2 is a perspective view of a base plate of the saw chain holder.

The base chain section 130, as shown in FIGS. 1, 2, and 4, is flush with the second base side surface 120 and has a thickness 130*t* in the width direction W that is less than a thickness 140*t* of the base body section 140 in the width direction W. The base chain section 130 thereby forms a groove 132 extending into the first base side surface 110. The thickness 140*t* is equal to a sum of the thickness 130*t* and a thickness 132*t* of the groove 132 in the width direction W. In an embodiment, the thickness 132*t* is approximately 0.05". The groove 132 extends along the height direction H and the longitudinal direction L around the base chain section 130 as shown in FIGS. 1 and 2.

The mounting section 150, as shown in FIGS. 1, 3, and 4, is disposed on a side of the base body section 140 opposite the base chain section 130 in the height direction H. The mounting section 150 extends along the longitudinal direction L and has a substantially consistent cross-sectional area along a plane extending in the height direction H and in the width direction W. The mounting section 150 has a thickness 150*t* that is less than the thickness 130*t* and less than the thickness 140*t*.

As shown in FIGS. 1-4, the base plate 100 has a base recess 160 extending into the second base side surface 120. In the height direction H, the base recess 160 starts at a top of the base plate 100 and extends through the base chain section 130; in the shown embodiment, the base recess 160 extends into the base body section 140. In the width direction W, the base recess 160 extends into the base plate 100 over more than half of the thickness 140*t*. As described in greater detail below, the dimensions of the base recess 160 depend on dimensions of a bar mounted sharpener 700. In all embodiments however, the base recess 160 starts at the top of the base plate 100, extends into a central section of the second base side surface 120, and is disposed opposite the groove 132 and a flat portion of the first base side surface 110 in the base chain section 130.

The base plate 100, as shown in FIGS. 1-3, includes a plurality of fastener receiving passageways 170 extending through the base plate 100 in the width direction W. In the shown embodiment, the fastener receiving passageways 170 extend through the base plate 100 in the base chain section 130 and in the base body section 140. The base plate 100 has four fastener receiving passageways 170 in the shown embodiment, however, the base plate may have any number of fastener receiving passageways 170. In an embodiment, the fastener receiving passageways 170 have a threaded inner bore. In another embodiment, the fastener receiving passageways 170 may have a smooth inner bore.

The base plate 100, as shown in FIGS. 1 and 2, includes a plurality of dowels 180 extending in the width direction W from the first base side surface 110. Each of the dowels 180 extends to a distance 180*d* in the width direction W that is approximately equal to the thickness 140*t*. The dowels 180 are disposed at opposite ends of the base body section 140 in the longitudinal direction L. In the shown embodiment, the dowels 180 are integrally formed with the base plate 100. In other embodiments, the base plate 100 may have a plurality of alignment passageways each receiving one of the dowels 180 such that the dowel 180 protrudes from the first base side surface 110.

In the shown embodiment, the base plate 100 is formed of a single material. In another embodiment, the base plate 100 may be formed of a plurality of materials, with the base chain section 130 formed of a different material than the base body section 140 and the mounting section 150. In such an embodiment, the base chain section 130 may be removably attachable to the base body section 140 to permit replacement of the base chain section 130 based, for example, on wear at the groove 132. In an embodiment, the base chain section 130 may be formed of a plastic material while the base body section 140 and the mounting section 150 are formed of a metal material.

Figure 5:
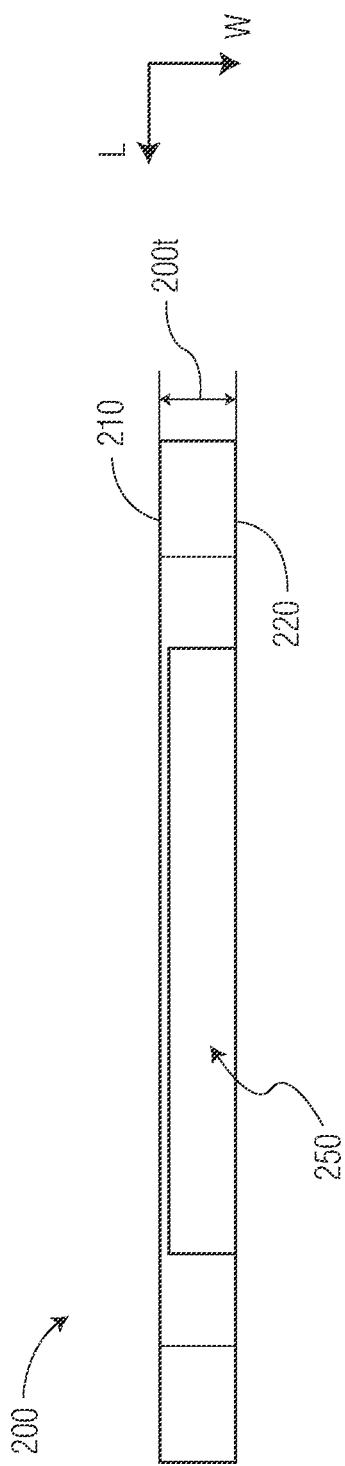
FIG. 5 is a top view of a cover plate of the saw chain holder.

The cover plate 200, as shown in the embodiment of FIGS. 1 and 5, is approximately rectangular with a first cover side surface 210 and an opposite second cover side surface 220. The first cover side surface 210 and the second cover side surface 220 are opposite one another in the width direction W. The cover plate 200 has a cover chain section 230 and a cover body section 240 extending along the height direction H.

The cover plate 200 is formed of a hard, durable material. In various embodiments, the cover plate 200 may be formed of various alloys and grades of metals, such as aluminum or steel, or various types of plastic such as polyethylene. In the shown embodiment, the cover plate 200 is integrally formed in a single piece. The cover plate 200 may be machined from a billet into the shown configuration, cast in a mold and then machined into the shown configuration, or molded into the shown configuration. In other embodiments, the cover plate 200 may be assembled from a plurality of components. In an embodiment, the cover plate 200 is formed of a same material as the base plate 100.

The cover chain section 230, shown in FIG. 1, protrudes from the cover body section 240 in the height direction H and the longitudinal direction L. In the shown embodiment, the cover chain section 230 has rounded end corners opposite one another along the longitudinal direction L. In other embodiments, the shape of the end corners of the cover chain section 230 are not necessarily round, but could be a 90° corner, a corner with multiple straight facets, or any other shape of corner. In the shown embodiment, the shape of the end corners of the cover chain section 230 correspond to the shape of the end corners of the base chain section 130.

The cover plate 200, as shown in FIGS. 1 and 5, has a thickness 200*t* in the width direction W that is constant along the height direction H through both the cover chain section 230 and the cover body section 240. The first cover side surface 210 is flat and entirely planar as shown in FIG. 5. In an embodiment, the thickness 200*t* is equal to the thickness 140*t* of the base body section 140 of the base plate 100.

As shown in FIGS. 1 and 5, the cover plate 200 has a cover recess 250 extending into the second cover side surface 220. In the height direction H, the cover recess 250 starts at a top of the cover plate 200 and extends through the cover chain section 230; in the shown embodiment, the cover recess 250 extends into the cover body section 240. In the width direction W, the cover recess 250 extends into the cover plate 200 over more than half of the thickness 200*t* of the cover plate 200. As described in greater detail below, the dimensions of the cover recess 250 depend on dimensions of a bar mounted sharpener 700. In all embodiments however, the cover recess 250 starts at the top of the cover plate 200, extends into a central section of the second cover side surface 220, and is disposed opposite the first cover side surface 210 in the cover chain section 230. The cover recess 250 has same dimensions as the base recess 160.

The cover plate 200, as shown in FIG. 1, includes a plurality of fastener receiving passageways 260 extending through the cover plate 200 in the width direction W. In the shown embodiment, the fastener receiving passageways 260 extend through the cover plate 200 in the cover chain section 230 and in the cover body section 240. The number of fastener receiving passageways 260 equals the number of fastener receiving passageways 170 in the base plate 100; in the shown embodiment, the cover plate 200 has four fastener receiving passageways 260. In the shown embodiment, the fastener receiving passageways 260 have a smooth inner bore. In an embodiment, each of the fastener receiving passageways 260 is shaped as a countersink in the second cover side surface 220.

The cover plate 200, as shown in FIG. 1, includes a plurality of alignment passageways 270 extending through the cover plate 200 in the width direction W. In the shown embodiment, the alignment passageways 270 extend through the cover plate 200 in the cover body section 240. The number of alignment passageways 270 equals the number of dowels 180 of the base plate 100. The alignment passageways 270 have a smooth inner bore and have a diameter that is slightly larger than a diameter of the dowels 180.

Figure 6:
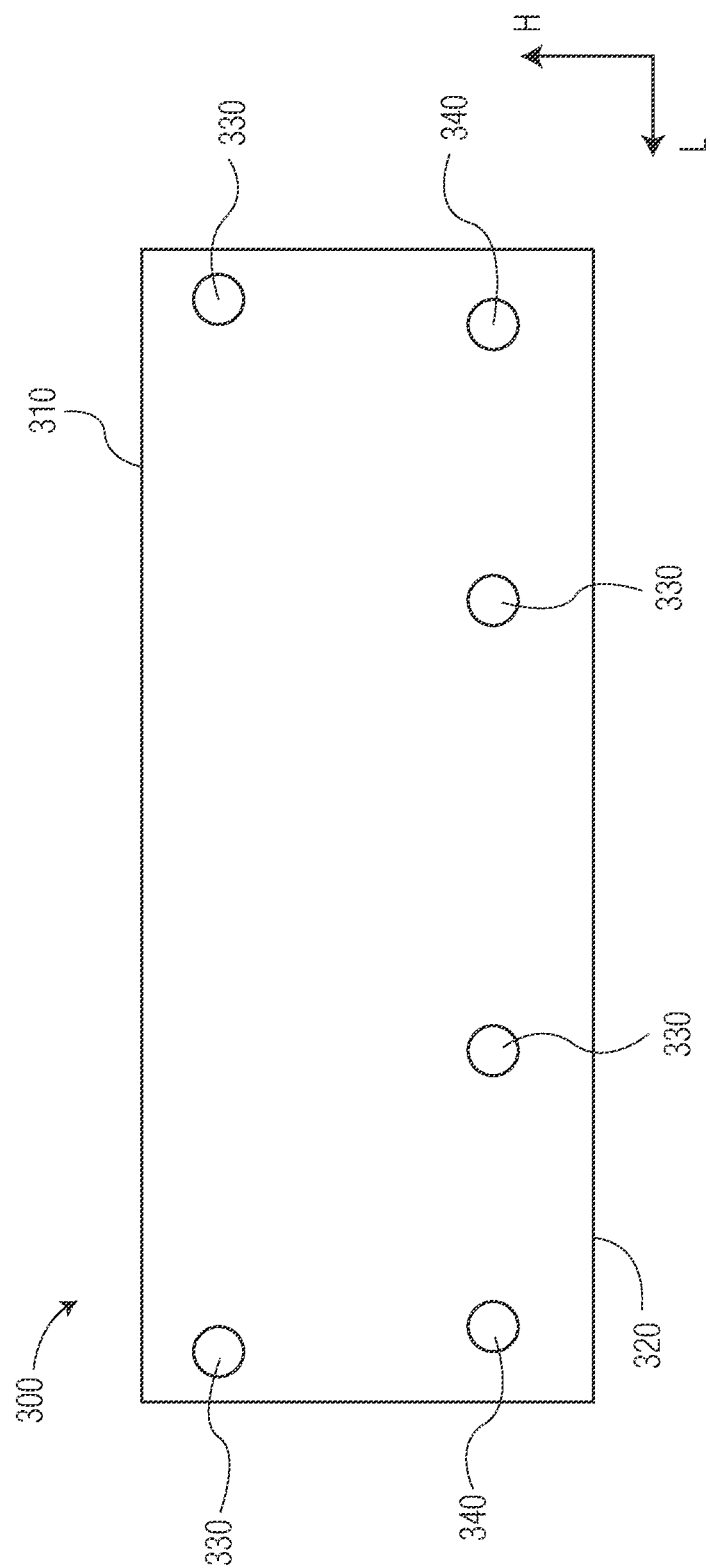
FIG. 6 is a side view of a spacer of the saw chain holder.

The spacer 300, as shown in FIGS. 1 and 6, is approximately rectangular and has a first edge 310 and a second edge 320 opposite the first edge 310 in the height direction H. In the shown embodiment, the first edge 310 and the second edge 320 are both straight and form 90° corners at ends of the spacer 300 in the longitudinal direction L. In another embodiment, the first edge 310 may have rounded corners corresponding to the shape of the end corners of the base chain section 130. The spacer 300 may be formed from a rigid, durable plastic material such as polyethylene. In an embodiment, the spacer 300 is cut from a sheet of the plastic material.

As shown in FIGS. 1 and 6, a plurality of fastener receiving passageways 330 and a plurality of alignment passageways 340 extend through the spacer 300 in the width direction W. The fastener receiving passageways 330 correspond in number, position, and dimensions to the fastener receiving passageways 170 of the base plate 100 and the fastener receiving passageways 260 of the cover plate 200. The alignment passageways 340 correspond in number, position, and dimensions to the dowels 180 and the alignment passageways 270.

The spacer 300 has one of a plurality of different thicknesses 300$t$ in the width direction W. Spacers 300 having different thicknesses 300$t$ are interchangeably usable with the saw chain holder 10. In an embodiment, the spacer 300 has a thickness 300$t$ of approximately 0.02", and in another embodiment, the spacer 300 has a thickness 300$t$ of approximately 0.0075". Different spacers 300 with different thicknesses 300$t$ may have different colors for ease of thickness 300$t$ recognition. In other embodiments, the spacers 300 may have more than two different thicknesses 300$t$ and may be any particular thickness 300$t$ as desired by the user for use of the saw chain holder 10 as detailed below.

Figure 7:
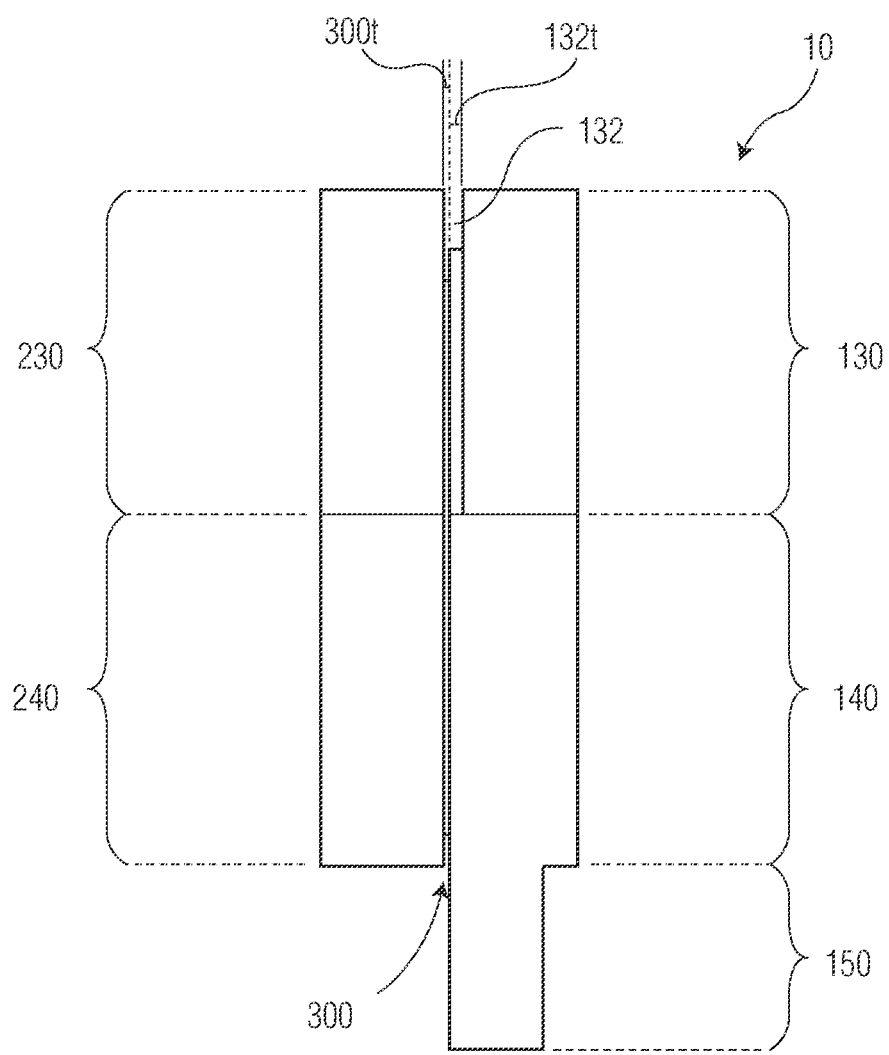
FIG. 7 is an end view of the saw chain holder in an assembled state.

The cover plate 200 is removably attachable to the base plate 100 by a plurality of fasteners 400 shown in FIG. 1 to form the assembled saw chain holder 10 shown in FIG. 7.

In the shown embodiment, each of the fasteners 400 is a flathead screw. In other embodiments, each of the fasteners 400 may be any form of fastener capable of engaging with the base plate 100 and the cover plate 200 for removable attachment of the base plate 100 to the cover plate 200 while retaining the spacer 300 as described below, such as a nut and bolt. The steps of the assembly of the saw chain holder 10 will now be described in greater detail with reference to FIGS. 1 and 7.

With the base plate 100, cover plate 200, and spacer 300 initially separated, as shown in FIG. 1, the spacer 300 is placed in abutment with the first base side surface 110 of the base plate 100. The dowels 180 extend through the alignment passageways 340 to temporarily position the spacer 300 on the first base side surface 110. The fastener receiving passageways 330 are aligned with the fastener receiving passageways 170 when the spacer 300 is positioned on the base plate 100. The first edge 310 of the spacer 300 does not extend into the groove 132 in the height direction H or the longitudinal direction L, and does not overlap with the groove 132 in the width direction W.

The cover plate 200 is then positioned over the base plate 100 with the dowels 180 extending into the alignment passageways 270. The cover plate 200 is moved along the dowels 180 and into abutment with the spacer 300, as shown in FIG. 7. In another embodiment, no spacer 300 is used and the cover plate 200 is moved into abutment with the base plate 100.

The fasteners 400 are positioned in the fastener receiving passageways 260 and extend through the fastener receiving passageways 330 of the spacer 300 and into the fastener receiving passageways 170. In the shown embodiment, the fastener receiving passageways 170 are threaded and the fastener receiving passageways 260 are not threaded; the fasteners 400 engage the threaded bores of the fastener receiving passageways 170 to retain the cover plate 200 in abutment with spacer 300. In another embodiment, the fastener receiving passageways 170 of the base plate 100 and the fastener receiving passageways 260 of the cover plate 200 are both unthreaded and the fasteners 400 are each a nut and bolt that engage each other to retain the cover plate 200 on the base plate 100 in abutment with the spacer 300. The cover plate 200 abuts the spacer 300 with a force sufficient to retain the cover plate 200 with the base plate 100 without compressing the spacer 300.

An assembled state of the saw chain holder 10 is shown in FIG. 7. The base chain section 130 is mirror symmetrical about a plane of the spacer 300 with the cover chain section 230; the base recess 160 and the cover recess 250 having the same dimensions are mirror symmetrical about the plane of the spacer 300. The base body section 140 is mirror symmetrical about the plane of the spacer 300 with the cover body section 240. As shown in FIG. 7, the cover plate 200 does not have a section that is mirror symmetrical about the plane of the spacer 300 with the mounting section 150 of the base plate 100.

Figure 8:
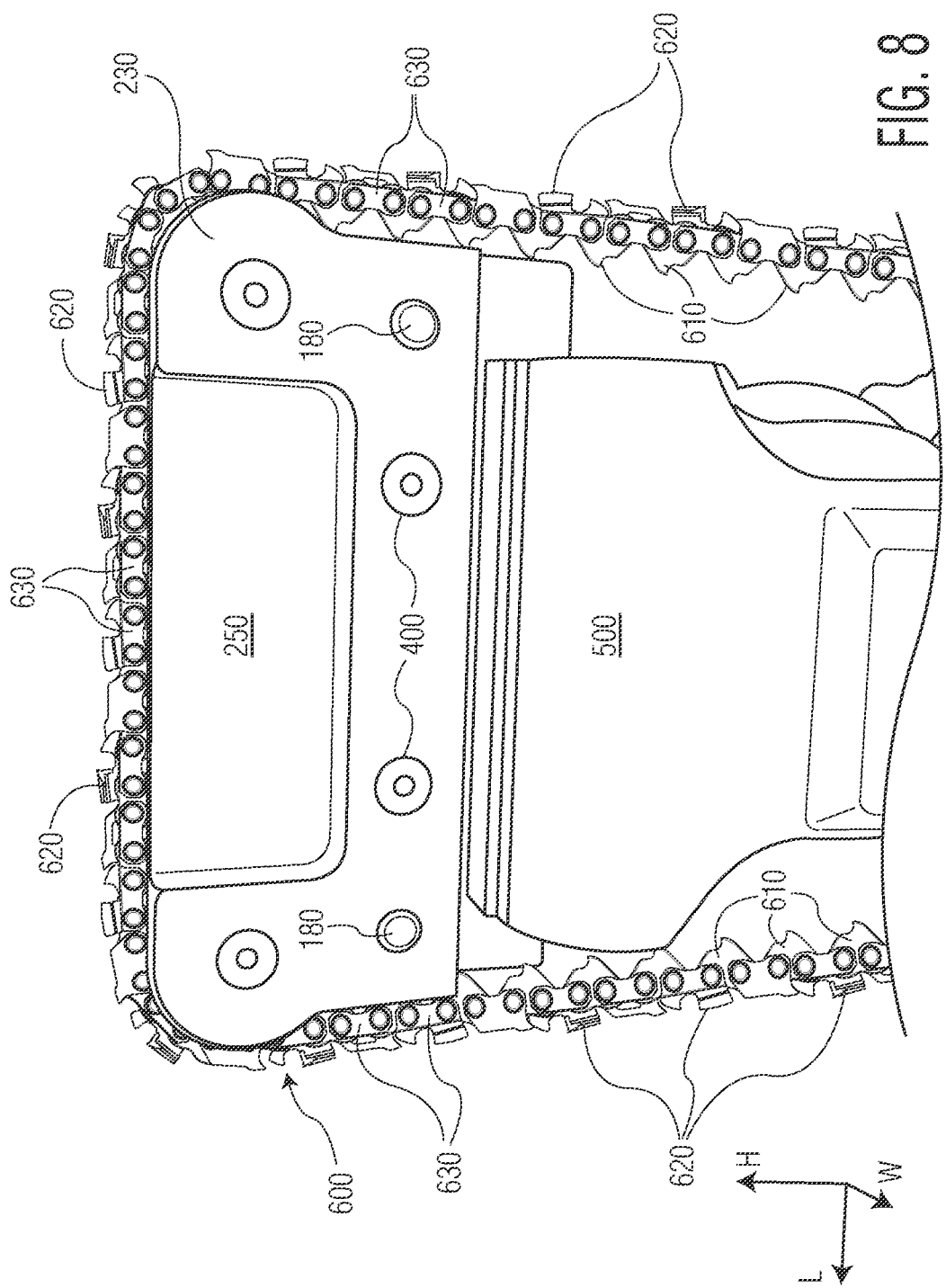
FIG. 8 is a perspective view of the saw chain holder with a mounting device and a chain.
Figure 9:
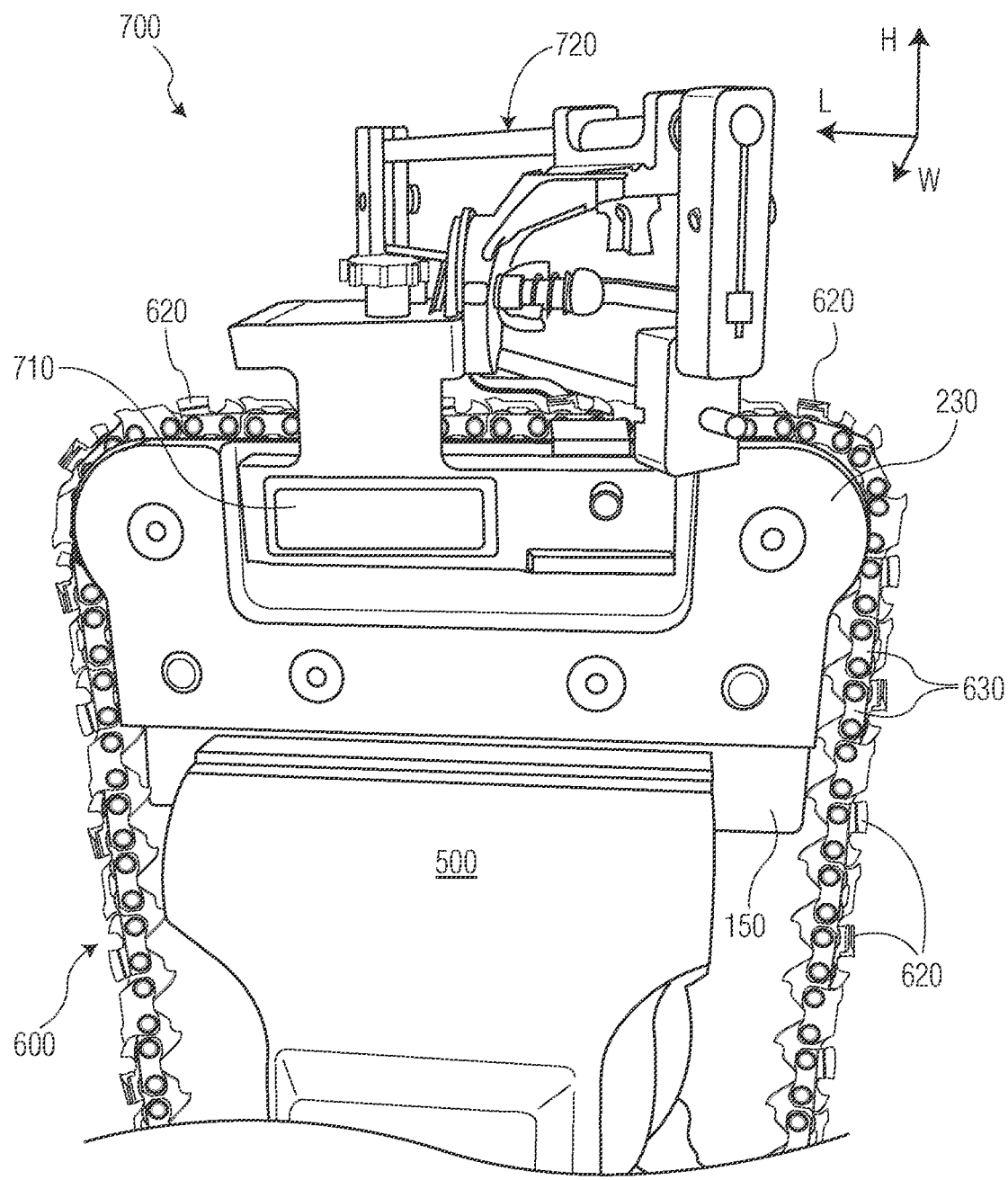
FIG. 9 is a perspective view of a sharpening assembly including the saw chain holder, the mounting device, the chain, and a bar mounted sharpener.

A sharpening assembly, shown in FIGS. 8 and 9, comprises the saw chain holder 10, a mounting device 500 for mounting the saw chain holder 10, a chain 600 disposed in the saw chain holder 10, and a bar mounted sharpener 700 attachable to the saw chain holder 10 to sharpen the chain 600. The use of the saw chain holder 10 as part of the sharpening assembly will now be described in greater detail with reference to FIGS. 7-9.

As shown in FIGS. 8 and 9, the mounting section 150 of the base plate 100 is positioned in the mounting device 500. The mounting device 500 clamps the mounting section 150 to retain the saw chain holder 10 in position. In various embodiments, the base plate 100 can be positioned in the mounting device 500 before assembly of the saw chain holder 10, or the saw chain holder 10 can be fully assembled before being positioned in the mounting device 500. In the embodiment shown in FIGS. 8 and 9, the mounting device 500 is a vise mounted on a workbench. In other embodiments, the mounting device 500 may be a vise mounted to a hitch of the vehicle or may be any other device capable of clamping to the mounting section 150 to retain the saw chain holder 10 in position.

The chain 600 disposed in the saw chain holder 10, as shown in FIGS. 8 and 9, is one of a variety of saw chains available for use in chainsaws. The chain 600 has a plurality of drive links 610, a plurality of cutting teeth 620, and a plurality of tie straps 630 aligned along a longitudinal length of the chain 600 and attaching the drive links 610 to the cutting teeth 620. The drive links 610 are driven within a bar of the chainsaw while the cutting teeth 620 protrude from the bar and cut while driven to move. The drive links 610 each have a thickness, in the width direction W with respect to the saw chain holder 10 shown in FIGS. 1, 8, and 9, referred to as a gauge of the chain 600. In various embodiments of the chain 600, the gauge may be 0.043", 0.05", 0.058", 0.063" or any other gauge known to those with ordinary skill in the art.

As shown in FIGS. 8 and 9, the chain 600 is positioned in the saw chain holder 10 with a portion of the chain 600 between the base plate 100 and the cover plate 200 in the width direction W. The drive links 610 are positioned in a gap between the base plate 100 and the cover plate 200 created by a combination of the groove 132 and a thickness 300$t$ of the spacer 300 as shown in FIG. 7. The tie straps 630 rest on an upper surface of each of the base plate 100 and the cover plate 200 and the cutting teeth 620 protrude outward as shown in FIGS. 8 and 9 for sharpening as described below.

The spacers 300 each having a different thicknesses 300$t$ are interchangeable to permit adjustment of the gap between the base plate 100 and the cover plate 200 to accommodate chains 600 with a range of different gauges. The saw chain holder 10 assembled without a spacer 300 has a gap equal to the thickness 132$t$. In an exemplary embodiment, the saw chain holder 10 assembled without the spacer 300 accommodates a chain 600 having a gauge of 0.05", the saw chain holder 10 assembled with a spacer 300 having a thickness 300$t$ of approximately .02" accommodates a chain 600 having a gauge of 0.063", and the saw chain holder 10 assembled with a spacer 300 having a thickness 300$t$ of approximately 0.0075" accommodates a chain 600 having a gauge of 0.058". As would be understood by one of ordinary skill in the art, the specific embodiments described herein are merely exemplary and the spacers 300 could be available in other thicknesses 300$t$ to accommodate a range of chains 600 with a range of gauges.

The gap that is the sum of the thickness 132$t$ and the thickness 300$t$ shown in FIG. 7 is sufficiently wide that the drive links 610 are movable within the gap along a longitudinal direction of the chain 600. In the shown embodiment, the protrusion and shape of the end corners of the base chain section 130 and the cover chain section 230 prevent the drive links 610 of the chain 600 from contacting other sections of the base plate 100 or cover plate 200 while the chain 600 is longitudinally moved along the saw chain holder 10.

The bar mounted sharpener 700, shown in FIG. 9, is one of a variety of sharpeners available for use in chainsaws and specifically adapted to mount to the bar of the chainsaw in order to sharpen the chain of the chainsaw. The bar mounted sharpener 700 has a pair of mounting legs 710 and a sharpening device 720 attached to the pair of mounting legs 710. In typical use, the mounting legs 710 secure to opposite sides of the bar of the chainsaw and the sharpening device 720 extends over a chain disposed in the bar of the chainsaw. The sharpening device 720 is movable into a plurality of different orientations and is slidable along an axis in order to manually sharpen the chain at a desired angle while the chain remains attached to the bar of the chainsaw.

As shown in FIGS. 8 and 9, the cover recess 250 and the base recess 160 are adapted and dimensioned to receive the mounting legs 710 of the bar mounted sharpener 700. In an embodiment, the cover recess 250 and the base recess 160 are adapted and dimensioned to receive the mounting legs 710 of a variety of different bar mounted sharpeners 700. The cover recess 250 and the base recess 160 are sized such that the portion of the assembled saw chain holder 10 between the base recess 160 and the cover recess 250 is adapted to an appropriate mounted distance between the mounting legs 710 and, consequently, the mounting legs 710 are mountable in the base recess 160 and the cover recess 250 such that the sharpening device 720 is positioned over the chain 600 disposed in the gap between the base plate 100 and the cover plate 200.

The sharpening assembly is shown in a sharpening state in FIG. 9 in which the saw chain holder 10 is mounted in the mounting device 500, the chain 600 is disposed in the gap between the base plate 100 and the cover plate 200, and the bar mounted sharpener 700 is mounted in the recesses 160, 250 of the saw chain holder 10. The sharpening device 720 can then be moved into a plurality of different orientations and, while remaining in contact with one of the cutting teeth 620, is slidable along an axis to manually sharpen the cutting tooth 620. When one of the cutting teeth 620 has been sufficiently sharpened by the sharpening device 720, a user can pull the chain 600 to move the chain 600 along a longitudinal direction of the chain 600 to a position in which a next cutting tooth 620 is in contact with the sharpening device 720.

The user can repeat this process to sharpen each of the cutting teeth 620 of the chain 600 while moving the chain 600 along the saw chain holder 10. Because the saw chain holder 10 is mountable in a mounting device 500, the user can sharpen the chain 600 with the chain 600 removed from the bar of the chainsaw. The saw chain holder 10 thereby increases efficiency by permitting continued use of the chainsaw with a different sharp saw chain while a previously dulled saw chain can be sharpened, even in the field, without requiring being attached to an inactive chainsaw. Further, as the bar mounted sharpeners 700 are widely available, the saw chain holder 10 improves flexibility by adapting existing sharpeners to improved uses.

Figure 10:
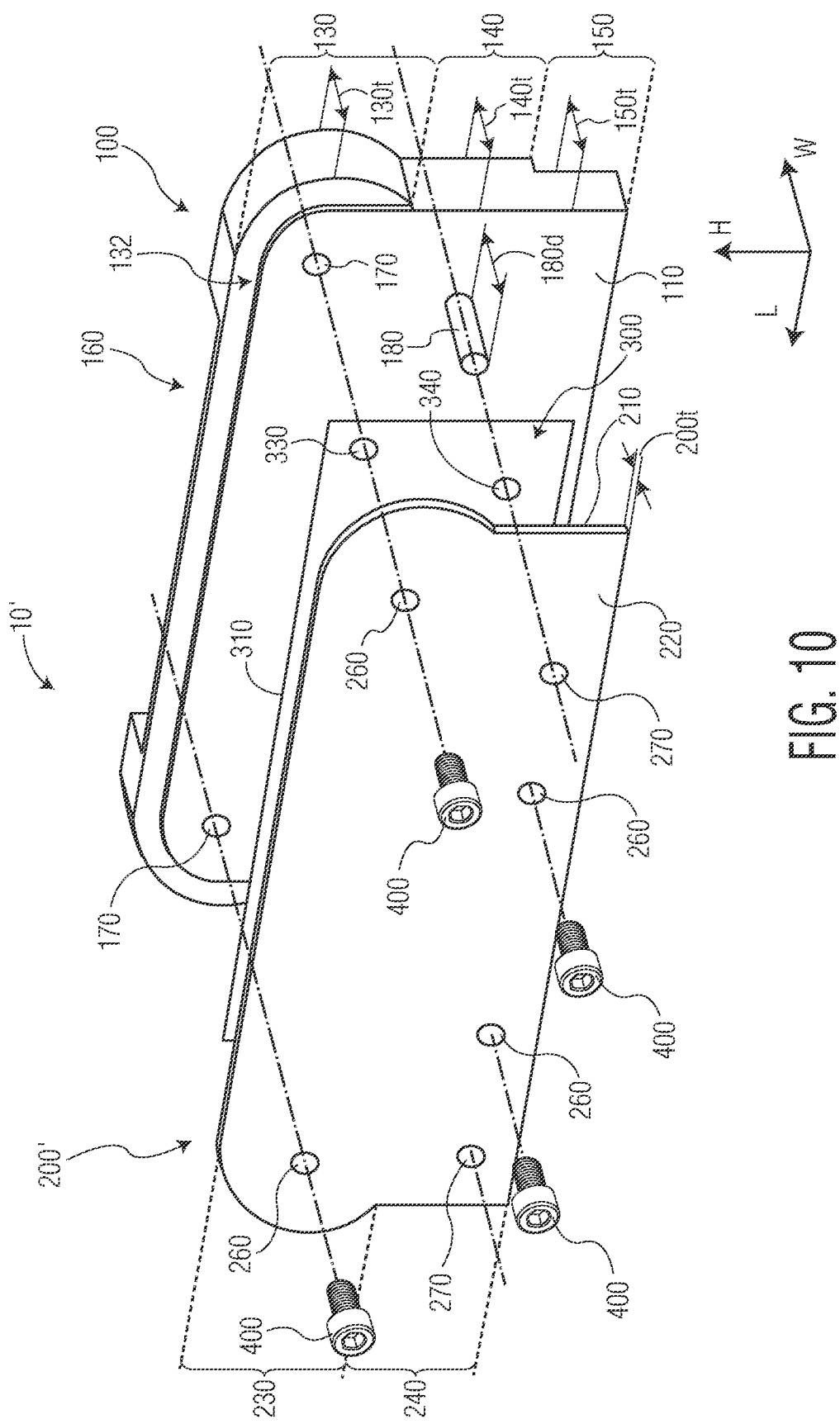
FIG. 10 is an exploded perspective view of a saw chain holder according to another embodiment.
Figure 11:
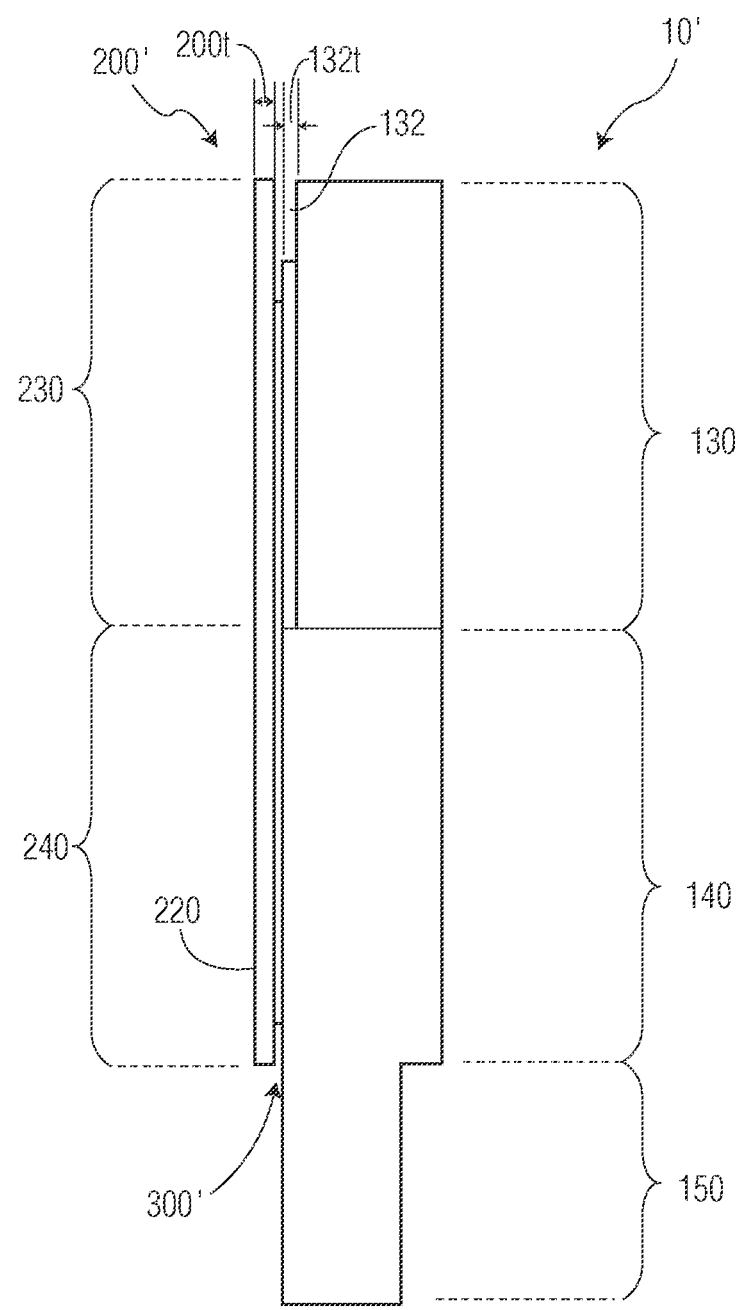
FIG. 11 is an end view of the saw chain holder of FIG. 10 in an assembled state.

A saw chain holder 10' according to another embodiment is shown in FIGS. 10 and 11. Like reference numbers refer to like elements and only the differences with respect to the saw chain holder 10 of the embodiments above will be described in detail herein.

The saw chain holder 10' has a cover plate 200' shown in FIGS. 10 and 11 that, in contrast to the cover plate 200 described in the embodiments above, does not have the cover recess 250 extending into the second cover side surface 220. Instead, the cover plate 200' has a thickness 200$t$ in the width direction W between the first cover side surface 210 and the second cover side surface 220 that is constant throughout an entirety of the cover plate 200'. The cover plate 200' in the shown embodiment is a flat piece of material. Both the first cover side surface 210 and the second cover side surface 220 of the cover plate 200' are planar. The first cover side surface 210 and the second cover side surface 220 are entirely parallel to one another in the longitudinal direction L.

As shown in FIG. 10, the thickness 200$t$ of the cover plate 200' is less than all of the thicknesses 130$t$, 140$t$, 150$t$ of the base plate 100. As shown in FIGS. 1 and 10, the thickness 200t of the cover plate 200' is less than the thickness 200t of the cover plate 200. In an embodiment, the thickness 200t of the cover plate 200' is equal to a thickness of the cover plate 200 at the cover recess 250 in the embodiment shown in FIG. 1. In an embodiment, the thickness 200t of the cover plate 200' is in a range from 0.060" to 0.065".

The cover plate 200' is formed of a hard, durable material. In various embodiments, the cover plate 200' may be formed of various alloys and grades of metals, such as aluminum or steel, or various types of plastic such as polyethylene. In the shown embodiment, the cover plate 200' is integrally formed in a single piece. The cover plate 200' may be machined from a billet into the shown configuration, cast in a mold and then machined into the shown configuration, or molded into the shown configuration. In other embodiments, the cover plate 200' may be assembled from a plurality of components. The thickness 200t of the cover plate 200' requires less machining or manufacturing and is more efficient and cost effective to produce. In an embodiment, the cover plate 200' is formed of a same material as the base plate 100.

The cover plate 200' is removably attachable to the base plate 100 by the fasteners 400 with the spacer 300 disposed between the base plate 100 and the cover plate 200', as shown in FIGS. 10 and 11, to form the assembled saw chain holder 10'. In the shown embodiment, the fasteners 400 are screws having a rectangular shaped socket head. In other embodiments, the fasteners 400 could have any other type of socket head or be any other type of fastener 400.

Figure 12:
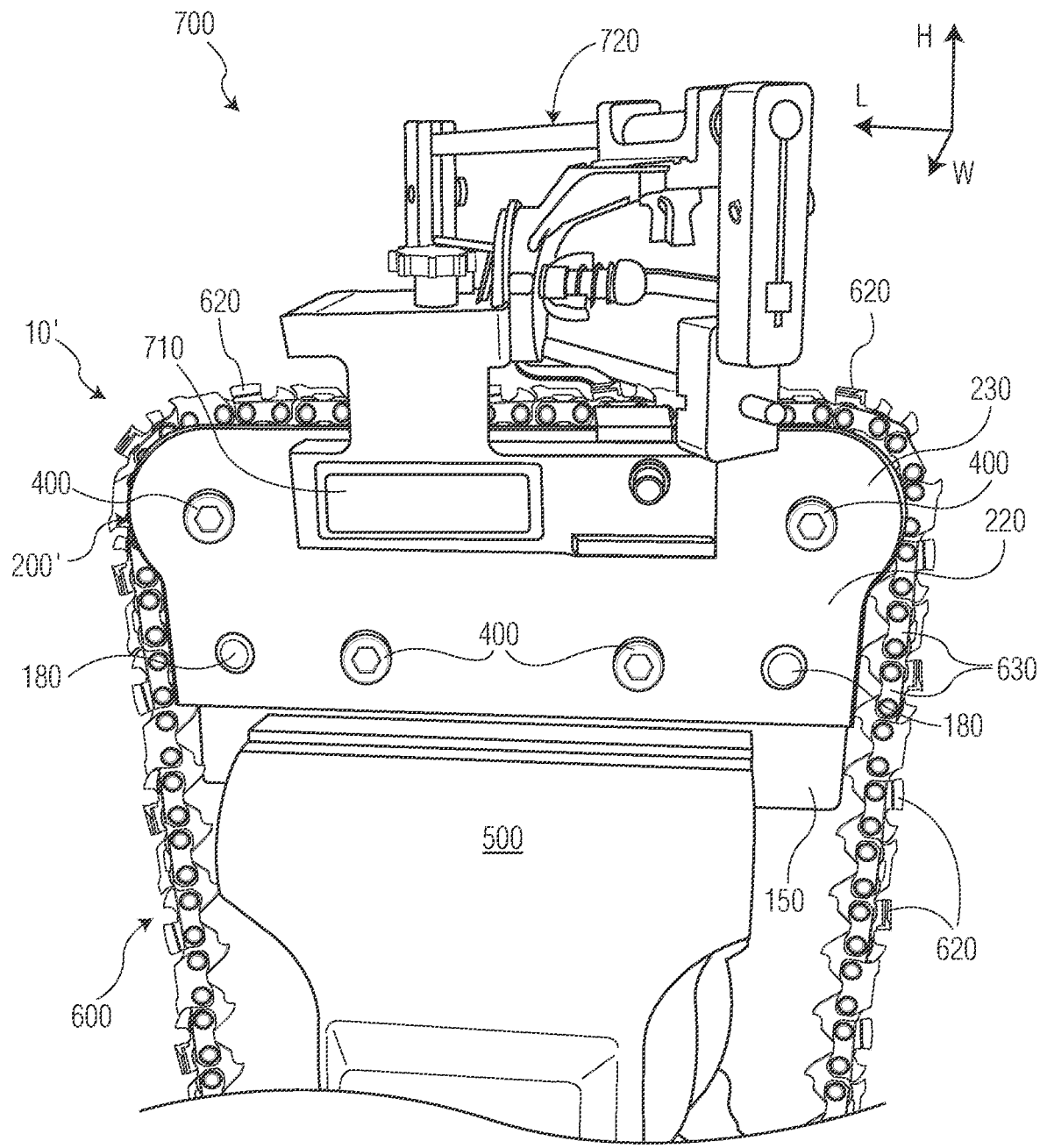
FIG. 12 is a perspective view of a sharpening assembly including the saw chain holder of FIG. 10, the mounting device, the chain, and the bar mounted sharpener.

A sharpening assembly according to another embodiment, as shown in FIG. 12, comprises the saw chain holder 10'. Like reference numbers refer to like elements and only the differences of the sharpening assembly from the embodiment shown and described in FIGS. 8 and 9 will be described in detail herein.

As shown in FIG. 12, the bar mounted sharpener 700 is mounted to the saw chain holder 10'. The thickness 200t of the cover plate 200' is adapted to the dimensions of the bar mounted sharpener 700; the cover plate 200' and the base recess 160 are sized such that the portion of the assembled saw chain holder 10' between the base recess 160 and the cover plate 200' is adapted to an appropriate mounted distance between the mounting legs 710. One of the mounting legs 710 is mountable in the base recess 160 and the other of the mounting legs 710 bears directly against the flat second cover side surface 220 of the cover plate 200'. The sharpening device 720 is positioned over the chain 600 disposed in the gap between the base plate 100 and the cover plate 200'. The use of the bar mounted sharpener 700 to sharpen the chain 600 is otherwise the same as the embodiment described above with respect to FIGS. 8 and 9.

In another embodiment, the dowels 180 shown in the embodiments of FIGS. 1, 2, 8-10, and 12 are omitted from the base plate 100. The alignment passageways 270 of the cover plate 200, 200' and the alignment passageways 340 of the spacer 300 are likewise omitted. When assembling the saw chain holder 10, the fasteners 400 each extend through the fastener receiving passageways 170, 260, 330 as shown and described, but are the only elements in this embodiment that position and attach the base plate 100, the cover plate 200, 200', and the spacer 300 to one another.

What is claimed is:

1. A saw chain holder with a bar mounted sharpener for sharpening a chain, comprising:
   a base plate having a first base side surface, an opposite second base side surface, a groove extending into the first base side surface, and a base recess extending into the second base side surface; and
   a cover plate removably attachable to the base plate and having a first cover side surface and an opposite second cover side surface, the cover plate is movable into an assembled state in which the first cover side surface abuts the first base side surface, the chain is movable along the groove between the base plate and the cover plate, and the bar mounted sharpener is mounted in the base recess, bears against the second cover side surface, and is positioned over the groove.

2. The saw chain holder of claim 1, wherein each of the first cover side surface and the second cover side surface are planar.

3. The saw chain holder of claim 2, wherein the first cover side surface and the second cover side surface are entirely parallel to one another.

4. The saw chain holder of claim 1, wherein the cover plate has a thickness in a width direction extending between the first cover side surface and the second cover side surface that is constant throughout an entirety of the cover plate.

5. The saw chain holder of claim 4, wherein the base plate has a base chain section in which the groove is disposed, a base body section connected to the base chain section, and a mounting section connected to the base body section, the mounting section having a thickness in the width direction that is less than a thickness of the base body section.

6. The saw chain holder of claim 5, wherein the thickness of the cover plate is less than the thickness of the mounting section and the thickness of the base body section.

7. The saw chain holder of claim 5, wherein the base chain section is formed of a different material than the base body section and the mounting section.

8. The saw chain holder of claim 5, wherein the cover plate has a cover chain section and a cover body section connected to the cover chain section, the base chain section protrudes from the base body section in a longitudinal direction of the saw chain holder and a height direction of the saw chain holder perpendicular to the longitudinal direction, and the cover chain section protrudes from the cover body section in the height direction and the longitudinal direction.

9. The saw chain holder of claim 8, wherein, in the assembled state, the base chain section and the cover chain section are mirror symmetrical about a plane between the base plate and the cover plate, the base body section and the cover body section are mirror symmetrical about the plane between the base plate and the cover plate, and no portion of the cover plate is mirror symmetrical with the mounting section about the plane between the base plate and the cover plate.

10. The saw chain holder of claim 1, wherein the base plate and the cover plate are each integrally formed of a same material.

11. The saw chain holder of claim 1, further comprising a spacer positioned between the base plate and the cover plate.

12. The saw chain holder of claim 11, wherein, in the assembled state of the saw chain holder with the spacer, the chain is movable along a gap between the base plate and the cover plate and the gap is a sum of a thickness of the groove and a thickness of the spacer.

13. The saw chain holder of claim 12, wherein the spacer is one of a plurality of interchangeable spacers each having a different thickness.

14. The saw chain holder of claim 13, wherein the different thicknesses of the interchangeable spacers are adapted to correspond to a plurality of different gauges of chains to be disposed in and movable along the gap.

15. The saw chain holder of claim 11, further comprising a plurality of fasteners removably securing the base plate, the cover plate, and the spacer together, each of the fasteners is received in one of a plurality of fastener receiving passageways extending through the base plate, one of a plurality of fastener receiving passageways extending through the cover plate, and one of a plurality of fastener receiving passageways extending through the spacer.

16. A sharpening assembly, comprising:
a mounting device;
a chain;
a bar mounted sharpener; and
a saw chain holder mounted in the mounting device, the saw chain holder including:
a base plate having a first base side surface, an opposite second base side surface, a groove extending into the first base side surface, and a base recess extending into the second base side surface; and
a cover plate removably attachable to the base plate and having a first cover side surface and an opposite second cover side surface, the cover plate is movable into an assembled state in which the first cover side surface abuts the first base side surface, the chain is disposed in and movable along the groove between the base plate and the cover plate, and the bar mounted sharpener is mounted in the base recess, bears against the second cover side surface, and is positioned over the groove.

17. The sharpening assembly of claim 16, wherein the bar mounted sharpener includes a pair of mounting legs and a sharpening device attached to the pair of mounting legs, one of the mounting legs is positioned in the base recess and one of the mounting legs bears directly against the second cover side surface.

18. The sharpening assembly of claim 17, wherein the cover plate has a thickness in a width direction extending between the first cover side surface and the second cover side surface that is constant throughout an entirety of the cover plate.

19. The sharpening assembly of claim 18, wherein the cover plate and the base recess are sized such that a portion of the saw chain holder between the cover plate and the base recess is adapted to an appropriate mounted distance between the mounting legs.

20. The sharpening assembly of claim 16, wherein the base plate has a base chain section in which the groove is disposed, a base body section connected to the base chain section, and a mounting section connected to the base body section, the mounting section is clamped in the mounting device and has a thickness that is less than a thickness of the base body section.

* * * * *